United States Patent [19]

Duyvesteyn et al.

[11] Patent Number: 4,614,543
[45] Date of Patent: * Sep. 30, 1986

[54] MIXED LIXIVIANT FOR SEPARATE RECOVERY OF ZINC AND LEAD FROM IRON-CONTAINING WASTE MATERIALS

[75] Inventors: Willem P. C. Duyvesteyn, Benthuisen, Netherlands; Mahesh C. Jha, Arvada, Colo.

[73] Assignee: AMAX Inc., Greenwich, Conn.

[*] Notice: The portion of the term of this patent subsequent to Sep. 9, 2003 has been disclaimed.

[21] Appl. No.: 696,978

[22] Filed: Jan. 31, 1985

[51] Int. Cl.$^4$ .................................................. C22B 3/00
[52] U.S. Cl. .................................... 75/101 R; 423/27; 423/45; 423/46; 423/49; 423/98; 423/109; 423/131; 423/150; 423/155; 423/324; 423/658.5; 75/114; 75/115; 75/117; 75/120; 75/121
[58] Field of Search ................ 423/98, 108, 103, 106, 423/131, 150, 111, 27, 45, 46, 49, 109, 155, 324, 658.5; 75/101 R, 115, 114, 120, 117, 121

[56] References Cited

U.S. PATENT DOCUMENTS 2,264,337 12/1941 Seguine et al. ..................... 423/109
3,375,069 3/1968 Duval ................................. 423/103

Primary Examiner—John Doll
Assistant Examiner—Robert L. Stoll
Attorney, Agent, or Firm—Michael A. Ciomek; Eugene J. Kalil

[57] ABSTRACT

A process is disclosed for the hydrometallurgical treatment of finely divided iron-containing steel plant dusts containing zinc, lead and such other metal values as calcium, manganese, silicon, magnesium, aluminum, cadmium, copper, and the like. The process is carried out by forming an aqueous slurry of the flue dust with a mixed lixiviant comprising HCl and $H_2SO_4$, the amount of sulfate ion concentration being in excess of the chloride ion concentration and in stoichiometric excess of that required to sulfate substantially all of the lead and calcium present. The amount of chloride ion present as HCl should be sufficient to maintain the pH at about 1 to 4. The leaching is conducted at a temperature ranging from ambient to below the boiling point for a time at least sufficient to effect dissolution of at least zinc and other metal values and form a residue containing iron oxide, calcium sulfate and lead sulfate.

5 Claims, No Drawings

MIXED LIXIVIANT FOR SEPARATE RECOVERY OF ZINC AND LEAD FROM IRON-CONTAINING WASTE MATERIALS

This invention relates to the hydrometallurgical treatment of iron-containing waste materials, such as steel plant dusts, for selective and separate recovery of zinc and lead values therefrom.

BACKGROUND OF THE INVENTION

During melting and refining of steel, the gas leaving the furnace carries a substantial amount of fine dust particles. To protect the atmosphere, these particles are removed in cyclones, scrubbers, and other similar devices. The dust particles are made up of two types of materials. Firstly, the dust consists of fine particles charged to the furnace, such as those of iron oxides, calcium oxide, and silica, which are mechanically carried away by the gas. Secondly, the dust consists of oxide particles of nonferrous metals, such as zinc and lead, which evaporate at the high temperatures of the steel bath and later condense and oxidize in the flue. The amounts of these nonferrous metal oxides in the dust increase as the dust is repeatedly recycled or as more scrap containing these metals are charged into the furnace.

The dust can be repeatedly recycled only for a limited number of cycles. With each recycle, the amount of dust to be collected increases due to larger proportion of the very fine dust particles in the feed. The feeding of such fine particles of low bulk density becomes increasingly difficult. Furthermore, as the amount of recycled dust increases, the energy requirement for reducing and melting iron and other metals from the dust increases.

Also, with repeated recycling, the nonferrous metal content of the dust increases to the point where their return to the steel bath adversely affects the steel melting operation. As oxides present in the slag, they attack the refractory lining of the furnace. In reduced form, these metals enter the molten steel at concentrations higher than permissible to meet specifications for proper mechanical and physical properties of the steel. At this point, the dust has to be removed from the system. Traditionally, steel plant dust has been considered a waste material and is generally disposed of in landfills.

However, such disposal methods are becoming more expensive, due to increasing land and transportation costs and due to increasingly stringent environmental protection regulations. Since the dust particles are very fine, they are likely to become airborne unless they are agglomerated to some extent or kept covered. Furthermore, the chemical nature of these dust particles are such that they classify as hazardous waste, based on the EP toxicity test prescribed by the U.S. Environmental Protection Agency. As disclosed in the article entitled "Characterization of Steelmaking Dusts from Electric Arc Furnace", *United States Bureau of Mine's Report of Investigation No.* 8750 (1983) by S. L. Law et al., the toxicity is related to the presence of lead, cadmium, and sometimes chromium.

In view of the above, there has been an increasing interest in the development of processes that will permit removal and recovery of nonferrous metals, such as zinc, lead, and cadmium, from steel plant dusts. The dust, depleted of these metals, can be recycled back to the steel furnace for recovery of iron or can be stored as a nontoxic waste. Since the tonnage of this material is substantial (about 500,000 tons was produced in 1979 from U.S. electric furnace operations only, according to the aforementioned article), it represents an important source of zinc, lead, and iron metals.

STATE-OF-THE-ART AND SHORTCOMINGS OF THE EXISTING PROCESSES

Because of increasing awareness for environmental concerns in the 1960's, attempts have been made to develop processes for the recovery of zinc and lead from steel plant dusts. At that time, pyrometallurgical processes were popular in primary zinc and lead industries, and therefore, it is not surprising that similar processes were attempted to treat the steel plant dust. Basically, the processes were variations of the commercial Waelz Process. In essence, the dust is partly reduced at high temperatures to volatilize zinc and lead metals, which are then oxidized and condensed as mixed oxides. A variety of equipment have been suggested to perform the actual operations of reduction, oxidation, and condensation, as disclosed in numerous U.S. patents listed below.

| U.S. Pat. No. | Date    | Inventor(s)       |
|---------------|---------|-------------------|
| 3,262,771     | 7/1966  | Ban               |
| 3,403,018     | 9/1968  | Thom              |
| 3,754,890     | 8/1973  | Fitch             |
| 3,756,804     | 9/1973  | Stevenson         |
| 3,770,416     | 11/1973 | Goksel            |
| 3,850,613     | 11/1974 | Allen             |
| 4,396,423     | 8/1983  | Stephens, et al.  |
| 4,396,424     | 8/1983  | Yatsunami, et al. |

None of these processes, insofar as it is known, have been implemented on a commercial scale. This is chiefly because of high capital and operating costs involved with high temperature (1,200° C.) operations which require expensive energy and also require elaborate gas handling and cleaning systems to reduce the atmospheric pollution. Another major shortcoming of the pyrometallurgical processes is that both lead and zinc are collected together in one intermediate product that needs considerable further processing to separate the two metals.

As an alternative, hydrometallurgical processes have been investigated, particularly after the escalating energy costs experienced in the early 1970's. It is also worth noting that about 90 percent of the primary zinc is now produced by a hydrometallurgical process.

One hydrometallurgical method, disclosed in U.S. Pat. No. 3,849,121 granted to Burrows, recommends the use of ammonium chloride as a lixiviant. Another process, disclosed in U.S. Pat. No. 4,071,357 granted to Peters, recommends use of ammonia and carbon dioxide gases. Use of strong caustic as a lixiviant is suggested in European Pat. No. 0040659 granted to Pooley et al. These alkaline leaching processes suffer from three common shortcomings: (1) The solutions generated are not compatible with existing zinc plant operations which all treat zinc sulfate solutions, (2) lead is also dissolved in these processes along with the zinc, and (3) the reagents are expensive.

Acid leaching of the steel plant dust would overcome some of these shortcomings. An article by D. Pearson entitled "Recovery of Zinc from Metallurgical Dusts and Fumes", Chapter 14, of the publication *Process and Fundamental Considerations of Selected Hydrometallurgical Systems*, M. C. Kuhn, Editor, Society of Mining Engineers of AIME (1981, pp. 153–168) describes the work performed at Warren Springs. Laboratory in which sulfuric acid was used to dissolve the zinc from electric arc furnace dusts. While zinc recovery of about 80 percent was obtained, iron dissolution was extensive, about 20 to 22 g/L, indicating high acid consumptions. An even more serious problem was the separation of residual solids from the solution.

A hydrochloric acid leaching system, as described in copending patent application Ser. No. 696,979, filed Jan 31, 1985 now U.S. Pat. No. 4,572,771, overcomes the solid/liquid separation problem. However, in this system, lead is also dissolved.

It would, therefore, be desirable to provide a process for the separate recovery of zinc and lead from steel plant dusts in a hydrometallurgical system that does not present a difficult solid/liquid separation problem. It has been found that a mixed sulfuric-hydrochloric system provides such a process and is the subject of this patent.

OBJECTS OF THE INVENTION

It is thus an object of this invention to provide a process for the removal of nonferrous metal values, such as zinc and lead, from iron-containing waste materials, such as steel plant dusts.

A more specific object is to provide a hydrometallurgical process for separate recovery of zinc in solution and of lead in the solids in a lixiviant system which permits easy solid/liquid separation.

These and other objects will more clearly appear when taken in conjunction with the following disclosure and the appended claims.

SUMMARY OF THE INVENTION

The process of this invention is based on treating the finely divided iron-containing waste materials in a mixed lixiviant system comprised of two common acids, sulfuric acid and hydrochloric acid. When this treatment is in accordance with the process conditions recommended, most of the zinc is dissolved in the solution with very little dissolution of iron. Lead is almost completely rejected into the residual solids phase. Solid/liquid separation can be easily accomplished using thickeners and/or filters. Commercially available flocculants, such as the flocculant sold under the trademark Dow MG-200, works effectively.

Zinc can be recovered from the solution as a high purity zinc chemical or metal by a process described in a copending patent application Ser. No. 696,979, filed Jan. 31, 1985, or by other appropriate processes. Lead can be recovered from the solids by a process described in copending patent application Ser. No. 696,986, filed Jan. 31, 1985, or by other appropriate processes.

The process of this invention is versatile in that it can treat a variety of feed materials containing a wide range of zinc and lead values. The composition of the lixiviant can vary considerably, but the amount of sulfuric acid added should be more than the stoichiometric requirement to sulfate all the lead and calcium present in the feed. The amount of hydrochloric acid added should be enough to result in a pH of about 3. Although the leaching can be performed at ambient temperature, a higher temperature, up to the boiling point, is preferred.

DETAILS OF THE INVENTION

The invention is applicable to all types of iron-containing waste materials, particularly the steel plant dusts. As detailed in the above mentioned S. L. Law et al. article, these dusts can vary considerably in their composition. For example, they may contain about 20 to 60 percent iron, about 5 to 40 percent zinc, and about 0.5 to 6 percent lead. In addition to these three metals of potential economic interest, the dusts contain substantial amounts of residue oxides of other metals, such as calcium manganese, silicon, magnesium, aluminum, copper, etc. The chemical composition of a typical midwest steel plant dust used in testing of the process of this invention is presented in Table 1.

TABLE 1

| Chemical Composition of the Steel Plant Dust Used in the Test Work | |
|---|---|
| Element | Weight Percent |
| Iron | 27.8 |
| Zinc | 25.8 |
| Lead | 3.03 |
| Cadmium | 0.041 |
| Calcium | 6.07 |
| Manganese | 3.12 |
| Silicon | 2.47 |
| Aluminum | 0.57 |
| Copper | 0.16 |
| Chlorine | 3.3 |
| Fluorine | 1.1 |
| Plus small amounts of barium, chromium, magnesium and sodium. | |
| Balance essentially oxygen. | |

The chemistry of the process is based on the relative insolubility of iron oxides in mildly acidic chloride solutions and that of lead in sulfate solutions. Zinc oxide, on the other hand, forms soluble chloride and sulfate. The temperature, pH, and concentrations of sulfate and chloride ions are the main process variables affecting the efficiency of the process as discussed in the following sections.

As illustrative of the invention, the following examples are given:

EXAMPLE 1

The composition of the steel plant dust used in the test work is presented in Table 1. A pulp density of about 10 percent, 100 g feed per liter of lixiviant (15 to 50 g/L $H_2SO_4$ solution) was used in all the tests to provide a zinc concentration of about 15 to 20 g/L in solution (filtrate and wash combined), compatible with the practice of solvent extraction or other similar processes for recovery of zinc from such solutions. The leaching was performed in a glass reactor equipped with a condenser, stirrer, thermometer, and a pH probe connected to a pH controller. The reactor was heated by an electric mantle connected to a temperature controller. Enough concentrated HCl was added as required to maintain the pH at the desired level. After the reaction was essentially complete (a long residence time of 4 hours was provided for this), a small amount of flocculant MG-200 was added to the slurry, and it was filtered hot. The first wash (about 2 bed volumes) was combined with the filtrate and called leach liquor. It was analyzed for zinc, iron, and lead. The cake was then washed thoroughly with water, dried, weighed, and analyzed for zinc. The zinc analyses in the feed and residue were used to calculate the percent of zinc leached.

Two similar tests were performed using 15 g/L $H_2SO_4$ as lixiviant but at different temperatures of 25 and 90° C. The pH was controlled at 2. The results are given in Table 2. It will be noted that the temperature does not affect the zinc leachability significantly. However, iron and lead rejections from solution were more complete at the higher temperature. Also, the slurry following the higher temperature leach filtered faster.

TABLE 2

Effect of Temperature on Selective Zinc Leaching

| Test Number | 1 | 2 |
|---|---|---|
| Temperature, °C. | 25 | 90 |
| HCl Added, g* | 21.8 | 21.0 |
| Zinc Leached, % | 70.7 | 71.0 |
| Leach Liquor Analysis, g/L | | |
| Zinc | 15.0 | 15.5 |
| Lead | 0.068 | 0.048 |
| Iron | 1.11 | 0.02 |

*To maintain pH at 2.0.

EXAMPLE 2

A series of three tests performed following the procedure described in Example 1. All the tests were performed for 4 hours at 90° C., using 100 g of steel plant dust and 1 liter of 15 g/L $H_2SO_4$ solution. The amount of concentrated HCl added in each test was, however, varied to control the pH at 1, 2, or 3 (measured at the temperature). The results obtained are presented in Table 3.

TABLE 3

Effect of pH on Selective Zinc Leaching

| Test Number | 1 | 2 | 3 |
|---|---|---|---|
| pH Controlled At | 1.0 | 2.0 | 3.0 |
| HCl Added, g | 24 | 21 | 17 |
| Zinc Leached, % | 71.3 | 71.0 | 70.2 |
| Leach Liquor Analysis, g/L | | | |
| Zinc | 15.5 | 15.5 | 15.2 |
| Lead | 0.056 | 0.048 | 0.037 |
| Iron | 0.4 | 0.02 | 0.01 |

It is noted that the pH in the range of 1 to 3 had only a small effect on zinc extraction. However, rejection of iron was strongly influenced by the pH and was essentially complete at pH 2 to 3. These conditions also decreased the lead concentration in the solution. More importantly, the HCl requirement was substantially reduced from about 24 g/L for pH 1 to 21 g/L for pH 2 and 17 g/L for pH 3. However, operation at a much higher pH, say above 4, will adversely affect the zinc extraction and is, therefore, not desirable. Thus, a pH in the range of 2 to 4, say about 3, is preferred.

EXAMPLE 3

To determine the effect of sulfate and chloride ion concentrations on the efficiency of the process, tests were performed using 15, 30, or 50 g/L $H_2SO_4$ solutions as lixiviant. Concentrated HCl was added to control the pH at 1.0 or 2.0. Results from these tests performed for 4 hours at 90° C. using 100 g steel plant dust and 1 liter of lixiviant are presented in Table 4. The general procedures were similar to those described in Example 1.

TABLE 4

Effect of Sulfate and Chloride Ion Concentrations on the Selective Zinc Leaching

| Test Number | 1 | 2 | 3 | 4 |
|---|---|---|---|---|
| pH Controlled At | 1.0 | 1.0 | 2.0 | 2.0 |
| Initial $H_2SO_4$, g/L | 15 | 50 | 15 | 30 |
| HCl Added, g | 24 | 7 | 20 | 10 |
| $SO_4^=$ Concentration, g/L | 7.2 | 32.3 | 7.3 | 18.4 |

TABLE 4-continued

Effect of Sulfate and Chloride Ion Concentrations on the Selective Zinc Leaching

| Test Number | 1 | 2 | 3 | 4 |
|---|---|---|---|---|
| $Cl_4^-$ Concentration, g/L | 24.0 | 5.9 | 20.0 | 12.0 |
| $SO_4^=/Cl$ Ratio | 0.3 | 5.5 | 0.4 | 1.5 |
| Zinc Leached, % | 71.3 | 75.0 | 70.2 | 69.3 |
| Leach Liquor Analysis, g/L | | | | |
| Zinc | 15.5 | 18.3 | 15.0 | 16.2 |
| Lead | 0.056 | 0.008 | 0.040 | 0.015 |
| Iron | 0.4 | 1.07 | 0.02 | 0.03 |

As will be noted from the results given in Table 4, the process operated efficiently at a wide range of sulfate and chloride ion concentrations. It appears that the zinc dissolution was slightly higher at higher sulfate-to-chloride ratio. Iron rejection was better at low sulfate/chloride ratio at a fixed pH. The lead rejection was strongly influenced by the sulfate/chloride ratio, decreasing from 56 ppm to 8 ppm as the ratio increased from 0.3 to 5.5. Since the chloride concentration in these solutions is too small to have any significant effect on complexing lead chloride, the sulfate ion concentration is the important variable. The data indicate that an excess of $H_2SO_4$ should be used to not only sulfate all the lead and calcium present in the feed but to also provide about 20 to 30 g/L sulfate ion in the solution. The amount of hydrochloric acid to be added should be enough to maintain the pH at 2 to 3. Some of the chloride present in the solution originated from the steel plant dust itself (see Table 1). The ratio of the sulfate ion concentration to the chloride ion concentration is prefereably at least about 2:1.

The effects of temperature, pH and the sulfate and chloride ion concentration are discussed below.

Effect of Temperature

As shown by Example 1, the leaching can be performed at ambient conditions or at a somewhat higher temperature. There is no need to exceed the boiling point and, therefore, the process does not require pressure vessels. The higher temperature, 90° C. as compared to 25° C., resulted in better filtering characteristics of the leach residue, as well as in lower iron and lead concentrations in the solution (see Table 2). In view of this, further testing of the process was carried out at 90° C. It is worth noting that the leaching reaction is exothermic, and thus in a well insulated commercial reactor, the requirements for external heating will be relatively small.

Effect of pH

The results of the three tests set forth in Example 2 clearly show that selective leaching of zinc can be accomplished at any pH in the range of about 1 to 3. The zinc dissolution was about 70 percent in all these cases, suggesting that the remaining zinc is present as zinc ferrite. Although a more acidic (lower pH) solution can dissolve additional amounts of zinc, iron will also dissolve. This is not desirable economically in that it would result in considerably higher acid costs for leaching, as well as increased cost for neutralizing and refining the solution prior to recovery of zinc therefrom.

Thus, a pH of about 2 is the preferred minimum pH recommended for the process. As will be apparent from the data presented in Table 3, iron rejection was essentially complete (less than 10 ppm in solution) at pH 3. However, a much higher pH, say above 4, is not preferred as it will adversely affect the zinc extraction. Therefore, a pH range of 2 to 4, for example a pH of about 3, is preferred.

Effect of Sulfate and Chloride Ion Concentrations

As discussed above, the pH of the solution basically determines the iron concentration in the solution (see Table 3). The lead concentration in solution has, however, a stronger dependency on the sulfate and chloride ion concentrations in the solution. Lead is insoluble in sulfate solutions, but form a soluble lead chloride complex in concentrated chloride solutions.

This effect is illustrated by the results of four tests presented in Example 3. In these tests, the sulfate ion concentration ranged from about 7 g/L to about 32 g/L and the chloride ion concentration ranged from about 6 g/L to about 24 g/L, the ratio of sulfate to chloride ion concentration ranging from about 0.3 to about 5.5. The increase in sulfate ion concentration had only a small beneficial effect on zinc extraction, which was also accompanied with an increase in iron dissolution. However, lead rejection was strongly influenced by the sulfate ion concentration. For example, the lead concentration in the leach liquor was 56, 15, and 8 ppm at sulfate ion concentrations of 7.2, 18.4, and 32.3 g/L, respectively (see Table 4).

In view of these findings, it is recommended that the amount of sulfuric acid used as lixiviant should be more than the stoichiometric requirements to sulfate all the lead and calcium present in the feed (both of these metals form insoluble sulfates). This can be determined by ascertaining that the leach liquor contains about 10 to 40 g/L, for example 20 to 30 g/L, sulfate ions. The chloride ion concentration in this relatively dilute range is not very critical. It would be primarily determined by the amount of chloride present in the feed (for example, 3.3 percent in the steel plant dust used in the present work, see Table 1) and the amount of HCl to be added to control the pH at about 3. Generally speaking, the sulfuric acid concentration in the leach solution may range from about 10 gpl to 50 gpl, e.g. 15 to 50 gpl, and the pulp density of slurry from about 5% to 40% by weight.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A process for the hydrometallurgical treatment of finely divided steel plant flue dusts containing by weight about 20% to 60% iron, about 5% to 40% zinc and about 0.5% to 6% lead as oxides, and also containing at least one other metal value selected from the group consisting of oxides of calcium, manganese, silicon, magnesium, aluminum, cadmium, copper, which comprises, forming an aqueous slurry of said steel plant flue dust with a mixed lixiviant comprising HCl and $H_2SO_4$, the amount of sulfate ion concentration being in excess of the chloride ion concentration and in stoichiometric excess of that required to sulfate substantially all of the lead and calcium present, the amount of chloride ion present as HCl being at least about 6g/1 sufficient to maintain the pH at about 1 to 4, leaching said steel plant flue dust at a temperature ranging from ambient to below the boiling point for a time at least sufficient to effect dissolution of at least said zinc and said at least one other metal value and form a residue containing at least iron oxide, calcium sulfate and lead sulfate, and then separating said residue from the solution containing said metal values.

2. The process of claim 1, wherein the amount of hycrochloric acid present is sufficient to maintain the pH at about 2 to 4, and wherein the ratio of the sulfate in concentration to the chloride in concentration is at least about 2:1.

3. The process of claim 1, wherein the hydrochloric acid concentration ranges from about 24 gpl to about 17 gpl to provide a pH ranging from about 1 to 3 and the sulfuric acid concentration ranges from about 10 to 50 gpl.

4. The process of claim 1, wherein the temperature of leaching ranges from about 25° C. to 90° C.

5. The process of claim 1, wherein the aqueous slurry has a pulp density by weight of about 5% to 40%.

* * * * *